(12) United States Patent
Cho et al.

(10) Patent No.: US 7,460,760 B2
(45) Date of Patent: Dec. 2, 2008

(54) OPTICAL WAVEGUIDE MASTER AND METHOD OF MANUFACTURING THE SAME

(75) Inventors: In Kui Cho, Daejeon (KR); Woo Jin Lee, Daejeon (KR); Seung Ho Ahn, Daejeon (KR); Sang Pil Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 84 days.

(21) Appl. No.: 11/449,412

(22) Filed: Jun. 8, 2006

(65) Prior Publication Data

US 2007/0058922 A1   Mar. 15, 2007

(30) Foreign Application Priority Data

Sep. 13, 2005   (KR) .................. 10-2005-0085158

(51) Int. Cl.
  *G02B 6/00*   (2006.01)
(52) U.S. Cl. ..................................... 385/147
(58) Field of Classification Search ........... None
  See application file for complete search history.

(56) References Cited

U.S. PATENT DOCUMENTS

| 5,526,454 A * | 6/1996 | Mayer ................. 385/49 |
| 5,761,350 A | 6/1998 | Koh |
| 6,793,405 B1 | 9/2004 | Murata et al. |
| 2005/0008316 A1* | 1/2005 | Yeniay ................. 385/129 |
| 2005/0133943 A1* | 6/2005 | Akutsu et al. ......... 264/1.28 |
| 2007/0025671 A1* | 2/2007 | Shimizu et al. ......... 385/129 |

FOREIGN PATENT DOCUMENTS

KR   10-2004-0089014   10/2004

* cited by examiner

*Primary Examiner*—Sung H Pak
(74) *Attorney, Agent, or Firm*—Ladas & Parry LLP

(57) ABSTRACT

Provided are an optical waveguide master and a method of manufacturing the same, which has a 90° optical path change structure and an integrated optical waveguide with a 45° inclined reflection surface. The optical waveguide with the inclined reflection surface manufactured using the optical waveguide master facilitates coupling between the active optical electronic device and the waveguide, thereby perfectly overcoming difficulty in conventional mass production. The optical waveguide makes it possible to accomplish connection between various optical devices and optical circuits, and becomes source technology of an optical printed circuit board (PCB) and a system on package (SOP) in the future.

10 Claims, 3 Drawing Sheets

OPTICAL WAVEGUIDE MASTER AND METHOD OF MANUFACTURING THE SAME

CROSS-REFERENCE TO RELATED APPLICATION

This application claims priority to and the benefit of Korean Patent Application No. 2005-85158, filed on Sep. 13, 2005, the disclosure of which is incorporated herein by reference in its entirety.

BACKGROUND

1. Field of the Invention

The present invention relates to an optical waveguide, and more particularly, to an optical waveguide master having an integrated 45° inclined reflection surface and a method of manufacturing the same.

2. Discussion of Related Art

Advancements in integrated circuit (IC) technology lending to higher operation speeds and greater integration density have enabled realization of high-performance microprocessors and high-speed, large-capacity memory chips. A next generation information telecommunication system comprised of a large-capacity parallel computer, or an asynchronous transfer mode (ATM) switching system operating at more than a Terra bit per second (Tb/s), requires improved signal processing capability. This, in turn, requires high-speed signal transfer and high-density wiring.

However, in a conventional device, information communication within a relatively short distance, such as a board-to-board distance or a chip-to-chip distance, is mainly accomplished using electrical signals, and therefore signal transfer speed and wiring density are limited. Also, electrical resistance of the wiring causes signal delay. Further, since high-speed signal transfer and high-density wiring are accompanied by noise caused by ElectroMagnetic Interference (EMI), counter-noise measures are also required.

In recent years, as a means for overcoming such drawbacks, a method for optically communicating a signal through an optical waveguide using polymer and glass fiber has been developed and used.

Such a method using an optical signal is applicable to several fields such as device-to-device, board-to-board, and chip-to-chip, and more particularly, is suitable to building of an optical signal communication system for use within a relatively short distance such as a chip-to-chip distance.

A conventional method for manufacturing an optical waveguide and a 90° inclined surface structure will now be described in detail.

First, a predetermined pattern mask is formed, a master is manufactured using the mask, and the optical waveguide is manufactured using molding or injection. Next, 45° inclined surface polishing is performed using a polisher. Alternatively, an ultraviolet (UV) lithography method not employing molding or injection may be used to form the waveguide. In this case also, the 45° inclined surface polishing is performed.

However, the method of manufacturing the optical waveguide using 45° inclined surface polishing has several drawbacks. Most notably, due to poor reproducibility, after one optical waveguide is produced, the polishing process has to be repeated every time in mass production.

Further, it is very difficult to reproduce a polished surface connected between a 45° inclined surface and the optical waveguide, and to control the length of the waveguide.

SUMMARY

The present invention is directed to implementation of an optical waveguide master and a method of manufacturing the same, based on a remarkable advance of optical interconnection technology, advent of optical layout technology, and system on packaging (SOP) technology for connection between an optical printed circuit board (PCB) and a chip.

The present invention is also directed to implementation of an optical waveguide master and a method of manufacturing the same, in which an integrated optical waveguide can be made in various shapes, thereby facilitating optical coupling between an active photo-electronic device (VCSEL, PIN, or PD) and the optical waveguide, and enabling inexpensive mass production.

One aspect of the present invention provides a method of manufacturing an optical waveguide master, the method including the steps of (i) forming an optical waveguide manufacturing master having at least one embossed pattern to be a core region, on a substrate; (ii) polishing the optical waveguide manufacturing master at predetermined regions at both ends of the embossed pattern to form inclined surfaces; (iii) cutting the optical waveguide manufacturing master with the inclined surfaces at both sides of and in parallel with the embossed pattern, and forming a main master having the embossed pattern and the inclined surfaces, and first and second sub masters having only the inclined surfaces without the embossed pattern; (iv) mutually facing, overlaying, and fixing inclined surfaces of the first and second sub masters to respective inclined surfaces of the main master, to form an optical waveguide manufacturing master with inclined surfaces; and (v) pouring PDMS (Poly-DiMethal-Siloxane) onto the optical waveguide manufacturing master with the inclined surfaces, covering the PDMS with a glass sheet, thermally curing the PDMS, and separating the cured PDMS from the glass sheet and the optical waveguide manufacturing master to complete a PDMS master of an engraved waveguide having the inclined surfaces.

The step (i) may include the steps of: forming a mask for forming a channel using photolithography; and forming the optical waveguide manufacturing master having the embossed pattern on the substrate through deep RIE (reactive ion etching) and dry etching using the formed mask.

On the optical waveguide manufacturing master, an engraved pattern adjacent to the embossed pattern may have a greater width than the embossed pattern.

The inclined surface may have an inclination of 30° to 60°.

The step (iv) may include the steps of: placing the main master and the sub masters on a glass plate, and matching the respective inclined surfaces in height using a microscope; and fixing rears of the sub masters to a bottom using a quick-drying adhesive, and forming the optical waveguide master with the inclined surfaces.

BRIEF DESCRIPTION OF THE DRAWINGS

The above and other features and advantages of the present invention will become more apparent to those of ordinary skill in the art by describing in detail preferred exemplary embodiments thereof with reference to the attached drawings in which.

DETAILED DESCRIPTION OF EXEMPLARY EMBODIMENTS

Hereinafter, exemplary embodiments of the present invention will be described in detail. However, the present invention is not limited to the exemplary embodiments disclosed below and can be implemented in various modified forms. Therefore, the present exemplary embodiments are provided for complete disclosure of the present invention and to fully inform the scope of the present invention to those of ordinary skill in the art.

FIGS. 1 to 5 illustrate a method of manufacturing an optical waveguide master according to the present invention.

Figure 1:
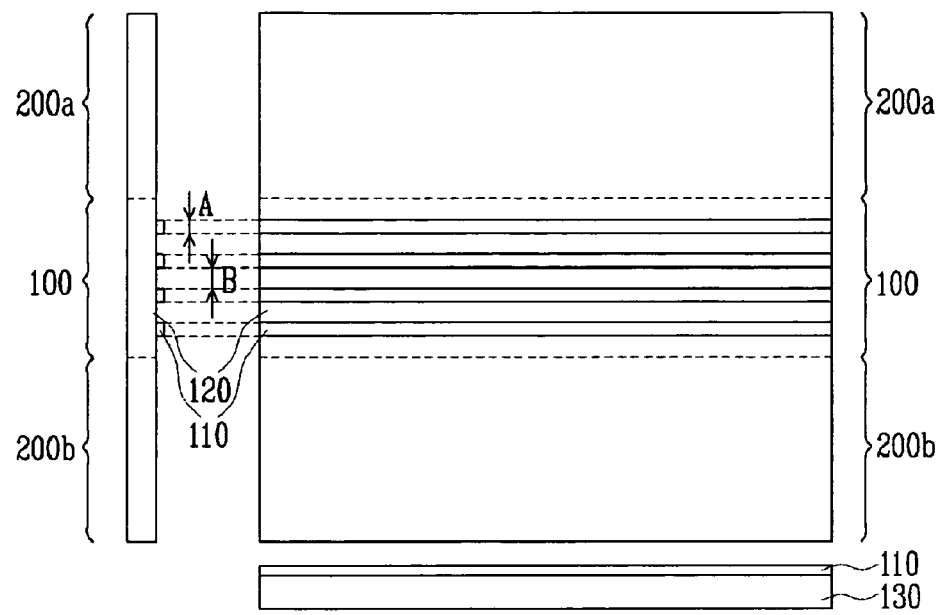
FIGS. 1 to 5 illustrate a method of manufacturing an optical waveguide master according to the present invention.

As shown in FIG. 1, an optical waveguide manufacturing master 100 having at least one embossed pattern 110, which is to be a core region, is formed on a silicon substrate 130. In detail, a mask for forming a channel is formed by photolithography, and the optical waveguide manufacturing master 100 having the embossed pattern 110 is formed on the silicon substrate 130 through deep reactive ion etching (RIE) and dry etching using the formed mask.

For clarity, the part of the silicon region where the embossed pattern 110 is formed is called a main master 100 and the regions on either side of the main master 100 are called first and second sub masters 200a and 200b. The main master 100 and the first and second sub masters 200a and 200b are collectively referred to as "an optical waveguide master."

Figure 2:
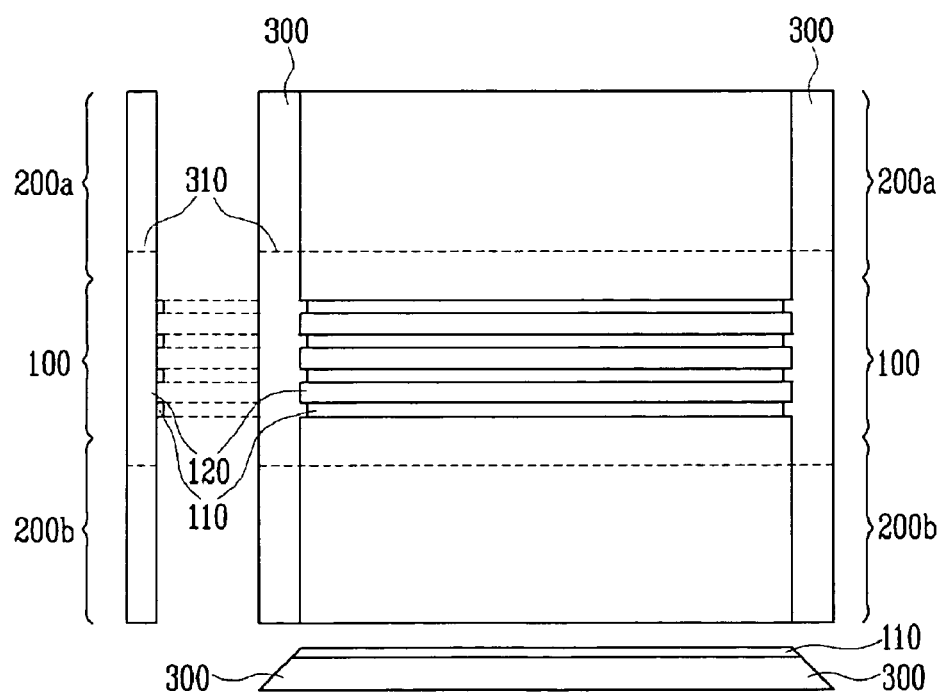

Next, as shown in FIG. 2, the optical waveguide master is formed to have 45° inclined surfaces 300 at predetermined regions of both end surfaces such that the main master 100 and the first and second sub masters 200a and 200b have the same inclined surfaces at both ends. The inclined surface may have an inclination of 30° to 60°, but is preferably formed to have an inclination of 45°.

The 45° inclined surface 300 can be formed by various inclined surface forming methods, but is preferably formed by polishing with a polishing paper using a 45° inclined surface dedicated jig. The polishing is performed until the 45° inclined surface becomes a mirror surface, thereby preventing reflection loss.

Figure 3:
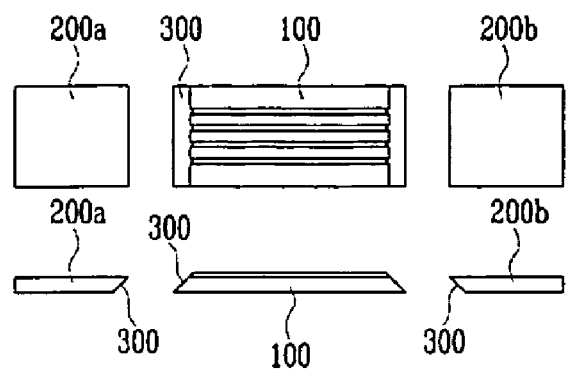

Next, as shown in FIG. 3, the optical waveguide master with the 45° inclined surface completely polished is cut to have both wing parts along a cut line 310 parallel with the embossed pattern 110. Accordingly, one main master 100 having the embossed pattern 110 and the 45° inclined surface 300, and two first and second sub masters 200a and 200b having only the 45° inclined surface 300 without the embossed pattern 110 are formed.

When the first and second sub masters 200a and 200b turned over, their 45° inclined surfaces 300 can be positioned over the 45° inclined surfaces 300 of the main master 100, respectively, to fit therewith.

Here, since the first and second sub masters 200a and 200b are obtained by polishing the optical waveguide manufacturing master on the same surfaces and then cutting it at both wing parts, the inclined surfaces of the main master 100 and the first and second sub masters 200a and 200b have the same inclination.

Accordingly, when the first and second sub masters 200a and 200b are turned over and overlaid upon the main master 100, the 45° inclined surfaces 300 of the main master 100 precisely match with the 45° inclined surfaces 300 of the first and second sub masters 200a and 200b, and an error resulting from a clad step of the master caused by mutual adherence is reduced to 2 μm or less.

Accordingly, an optical waveguide manufacturing master with a 45° inclined surface and reduced error resulting from a clad step can be manufactured with ease.

Figure 4:
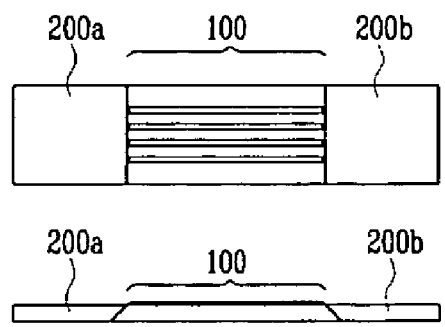

FIG. 4 illustrates an optical waveguide master completed by turning over and attaching the sub masters 200a and 200b to both inclined surfaces of the main master 100, which is an embossed optical waveguide.

It is very important that the 45° inclined surfaces of the main master 100 for the embossed optical waveguide precisely match the 45° inclined surfaces of the cut first and second sub masters 200a and 200b, and that the master and the sub masters match each other in height. When they do not match, that is, the sub masters 200a and 200b are shorter than the main master 100, which is the original optical waveguide, a core is unnecessarily formed, thereby forming an inaccurate waveguide model. When the sub masters 200a and 200b are taller than the main master 100, the 45° inclined surfaces 300 are not formed.

Since it is very difficult to accurately match the sub masters with the main master in height, it has been difficult to manufacture an integrated waveguide until now.

According to the present invention, however, the sub masters are cut from the main master and turned over, thereby completely solving the problem of height mismatch between the two masters.

After that, in order to accurately couple the two masters, they are put on a glass plate, their respective inclined surfaces are accurately matched in height with a microscope, and rears of the sub masters 200a and 200b are fixed to a bottom using a quick-drying adhesive, thereby coupling the silicon masters for the integrated optical waveguide master.

Figure 5:
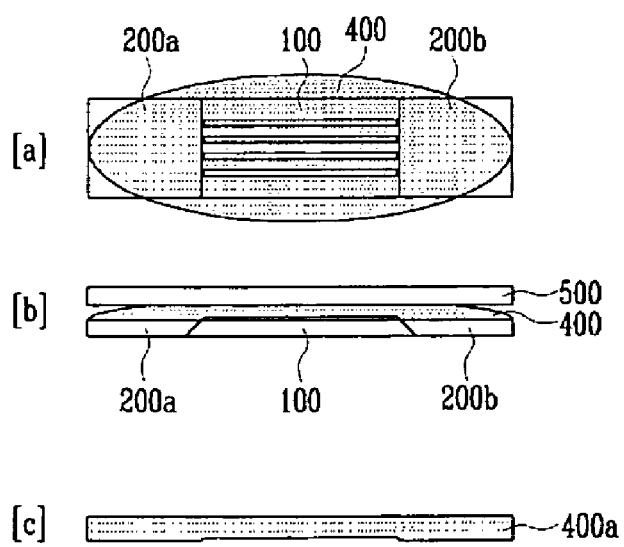

Next, as shown in FIG. 5, Poly-DiMethal-Siloxane (PDMS) 400 is poured onto the completed embossed silicon master, covered with a glass sheet 500, and thermally cured. Accordingly, a PDMS master 400a having a reflection surface with the 45° inclined surface 300 is manufactured.

As such, the PDMS master 400a is an integrated substrate formed of PDMS, and the waveguide has an engraved pattern formed on one surface of the integrated substrate and 45° inclined surfaces formed at both ends of the engraved pattern. The engraved pattern can be also formed on both surfaces of the integrated substrate. Alternatively, a 45° inclined surface may be formed at only one end of the engraved pattern.

Figure 6:
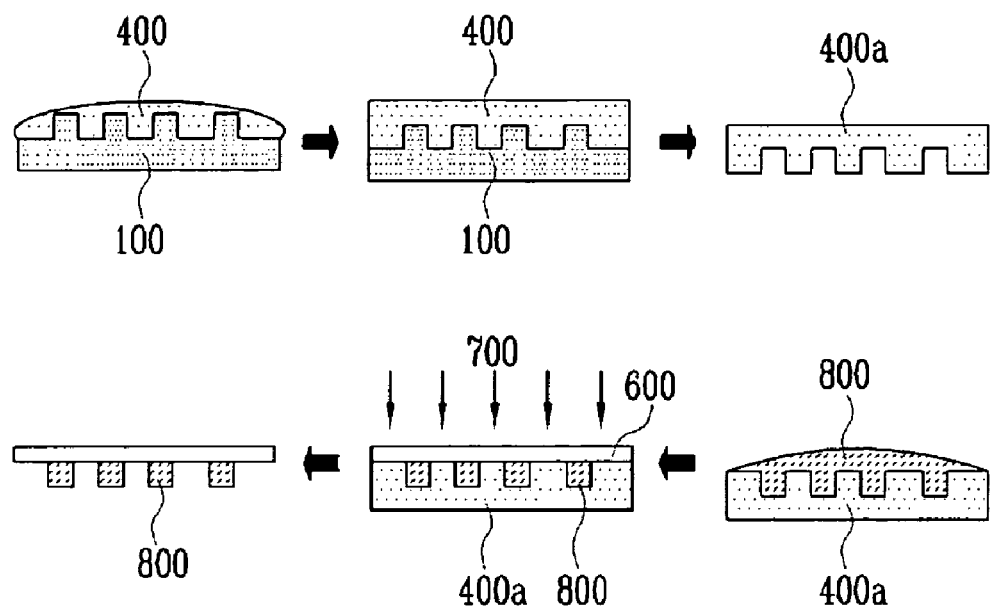
FIG. 6 illustrates a process of manufacturing an optical waveguide using a PDMS master manufactured according to the present invention.

FIG. 6 illustrates a process of manufacturing an optical waveguide using a PDMS master manufactured according to the present invention.

Referring to FIG. 6, the PDMS 400 is poured onto the silicon master 100 manufactured in FIG. 4, thereby completing the PDMS master 400a as in FIG. 5. Next, a core material 800 is poured onto the PDMS master 400a, and a cover sheet 600 having a slightly low refractive index is placed on top of the poured core material 800.

The cover sheet 600 is pressed a little using the jig to prevent generation of a slab and then cured using an ultraviolet (UV) light source 700. This completes formation of the optical waveguide 800 having the 45° inclined surface 300.

The inclined surface has an inclination of 30° to 60°, and preferably, 45°.

Figure 7:
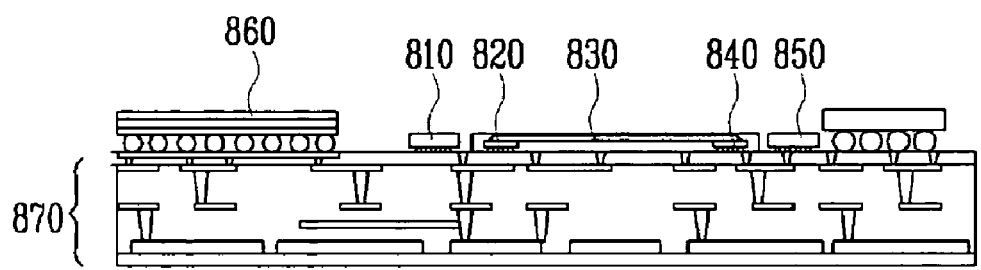
FIG. 7 illustrates technology related to application of a 45° inclined surface integrated optical waveguide and an exemplary embodiment related to the scope of its application according to the present invention.

FIG. 7 illustrates technology related to application of a 45° inclined surface integrated optical waveguide and an exemplary embodiment related to the scope of its application according to the present invention.

As shown in FIG. 7, a completed optical waveguide 830 can provide interconnection for signal transmission between chips, and its principle will be briefly described below.

Nowadays, due to the increased amounts of information and speed-up of telecommunications, several GHz or more are required even in signal transmission between chips. Further, current high-speed signal transmission will further accelerate in the future, and transmission capacity per channel between chips or even within a chip will further increase too. This trend is expected to bring about advent of system on package (SOP) technology from system on chip (SOC) and system in package (SIP) technologies. This technology essentially accompanies issues of easy inter-chip signal connection and signal integrity. In FIG. 7, various processor chips and CMOS/SOC chips exist on a multi-layer PCB 870, and high-speed signal transmission therebetween will be required. Thus, electro-optical devices (VCSEL, and LD) 820 and their drivers 810 and 850 will be required. After an electric signal is converted into an optical signal in an electro-optical device, the optical signal requires a transmission medium for transmission to other chips. Once transmitted, the signal is again restored into an electric signal by a photo-electronic device (PD) 840, and transmitted to a desired chip. Here, when the 45° inclined surface integrated optical waveguide manufactured using the inventive method is used, inexpensive mass production becomes possible. Further, when the inventive structure is used even in a communication module, an optical module can be configured with ease. In such a case, a method in which the 45° inclined surface is provided at only one end is adopted.

As described above, the inventive optical waveguide master and method of its manufacture have several effects.

First, a molding master simultaneously equipped with a multi-mode optical waveguide and a 45° inclined surface is made possible, so that the integrated optical waveguide with the 45° inclined surface, enabling a 90° optical path change of various shapes is made possible. This facilitates optical coupling between active photo-electronic devices (VCSEL, PIN, PD) and the optical waveguide, as well as between the active optical devices, and enables low-priced mass production.

Second, the conventional problem of it being difficult to accurately control the length between access pointers, which made it unfeasible to mass-produce a structure having the same length of the optical waveguide, can be solved.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of manufacturing an optical waveguide master, the method comprising the steps of:
 (i) forming an optical waveguide manufacturing master having at least one embossed pattern to be a core region, on a substrate;
 (ii) polishing the optical waveguide manufacturing master at predetermined regions at both ends of the embossed pattern to form inclined surfaces;
 (iii) cutting the optical waveguide manufacturing master with the inclined surfaces at both sides of and in parallel with the embossed pattern, and forming a main master having the embossed pattern and the inclined surfaces, and first and second sub masters having only the inclined surfaces without the embossed pattern;
 (iv) mutually facing, overlaying, and fixing inclined surfaces of the first and second sub masters to respective inclined surfaces of the main master, to form an optical waveguide manufacturing master with inclined surfaces; and
 (v) pouring PDMS (Poly-DiMethal-Siloxane) onto the optical waveguide manufacturing master with the inclined surfaces, covering the PDMS with a glass sheet, thermally curing the PDMS, and separating the cured PDMS from the glass sheet and the optical waveguide manufacturing master to complete a PDMS master of an engraved waveguide having the inclined surfaces.

2. The method according to claim 1, wherein the step (i) comprises the steps of:
 forming a mask for forming a channel using photolithography; and
 forming the optical waveguide manufacturing master having the embossed pattern on the substrate through deep RIE (reactive ion etching) and dry etching using the formed mask.

3. The method according to claim 1, wherein, on the optical waveguide manufacturing master, an engraved pattern adjacent to the embossed pattern has a greater width than the embossed pattern.

4. The method according to claim 1, wherein the inclined surface has an inclination of 30° to 60°.

5. The method according to claim 1, wherein in the step (ii), the polishing is performed using a polishing paper and a 45° inclined surface dedicated jig.

6. The method according to claim 5, wherein the polishing is performed until the inclined surface becomes a mirror surface to prevent reflection loss.

7. The method according to claim 1, wherein the step (iv) comprises the steps of:
 placing the main master and the sub masters on a glass plate, and matching respective inclined surfaces in height using a microscope; and
 fixing rears of the sub masters to a bottom using a quick-drying adhesive, and forming the optical waveguide manufacturing master with the inclined surfaces.

8. An optical waveguide master, wherein the master is formed of an integrated substrate, the substrate has at least one engraved pattern on at least one side surface, wherein the engraved pattern has parallel side surfaces, a bottom surface, an open top, and side ends which form an optical waveguide shape, and the engraved pattern having the optical waveguide shape has an inclined surface at least one of the side ends,
 wherein the inclined surface extends from a bottom edge to a top edge of the engraved pattern.

9. The master according to claim 8, wherein the inclined surface has an inclination of 30° to 60°.

10. The master according to claim 8, wherein the substrate is formed of PDMS (Poly-DiMethal-Siloxane).

* * * * *